(12) United States Patent
Dalrymple

(10) Patent No.: US 8,727,321 B2
(45) Date of Patent: May 20, 2014

(54) OUTRIGGER

(75) Inventor: Roger Kenneth Roy Dalrymple, Bulls (NZ)

(73) Assignees: Roger Kenneth Roy Dalrymple, Bulls (NZ); Sharon Lucelle Dalrymple, Bulls (NZ); Manawatu Trustees Limited, Palmerston North (NZ)

( * ) Notice: Subject to any disclaimer, the term of this patent is extended or adjusted under 35 U.S.C. 154(b) by 491 days.

(21) Appl. No.: 12/934,955

(22) PCT Filed: Mar. 26, 2009

(86) PCT No.: PCT/NZ2009/000042
§ 371 (c)(1),
(2), (4) Date: Dec. 22, 2010

(87) PCT Pub. No.: WO2009/120098
PCT Pub. Date: Oct. 1, 2009

(65) Prior Publication Data
US 2011/0100305 A1 May 5, 2011

(30) Foreign Application Priority Data
Mar. 27, 2008 (NZ) .................................. 566998

(51) Int. Cl.
*A01K 3/00* (2006.01)
(52) U.S. Cl.
USPC .................................. 256/10; 256/12; 256/52
(58) Field of Classification Search
USPC ........ 256/10, 12, 47, 48, 52; 174/158 F, 16 F, 174/163 F
See application file for complete search history.

(56) References Cited

U.S. PATENT DOCUMENTS

| | | | | |
|---|---|---|---|---|
| 1,653,767 A * | 12/1927 | Hill | ..................................... | 256/3 |
| 2,010,309 A * | 8/1935 | Lindsey | ..................... | 174/158 F |
| 2,084,619 A * | 6/1937 | Love | ................................. | 256/3 |
| 2,294,235 A * | 8/1942 | Ives | ........................... | 174/158 F |
| 2,856,159 A | 10/1958 | Braddock | | |

(Continued)

FOREIGN PATENT DOCUMENTS

| | | |
|---|---|---|
| AU | 704590 | 7/1998 |
| AU | 732437 | 4/1999 |

(Continued)

OTHER PUBLICATIONS

International Search Report for PCT Application No. PCT/ NZ2009/000042, dated Jul. 7, 2009.

*Primary Examiner* — Michael P Ferguson
(74) *Attorney, Agent, or Firm* — Workman Nydegger

(57) ABSTRACT

An outrigger, for carrying an electric wire at a distance outward from a support, comprises a first elongate arm (512). A first support device (513B) at a distal end of the arm is adapted for suspending a portion of the wire (517B). The outrigger is suspended from a support, e.g. from a support wire (516) carried on a post (515), by a second support device (520) at a proximal end of the arm. When the outrigger is suspended by the second support device and the wire is suspended from the first support device, the outrigger is movable, from a rest position in which the arm extends outwardly from the support, to move the first support device and the wire toward the support when the first support device or the wire is impacted in a direction toward the support, and afterwards to move the outrigger back to the rest position.

13 Claims, 11 Drawing Sheets

(56) References Cited

U.S. PATENT DOCUMENTS

| | | | |
|---|---|---|---|
| 3,516,643 A * | 6/1970 | Cox | 256/10 |
| 3,759,490 A | 9/1973 | Heuberger | |
| 4,081,177 A | 3/1978 | Graff | |
| 4,771,137 A | 9/1988 | Thompson | |
| 5,004,211 A * | 4/1991 | Rayner | 256/47 |
| 5,461,364 A | 10/1995 | Sanford, Jr. et al. | |

FOREIGN PATENT DOCUMENTS

| | | |
|---|---|---|
| GB | 1587283 | 4/1981 |
| GB | 2295627 | 6/1996 |
| NZ | 168880 | 11/1972 |
| NZ | 195922 | 11/1984 |

\* cited by examiner

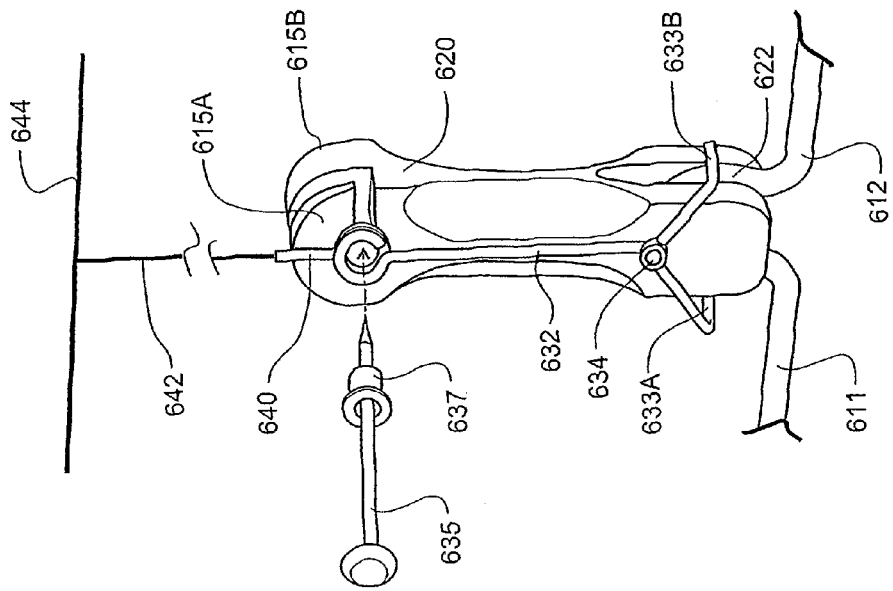
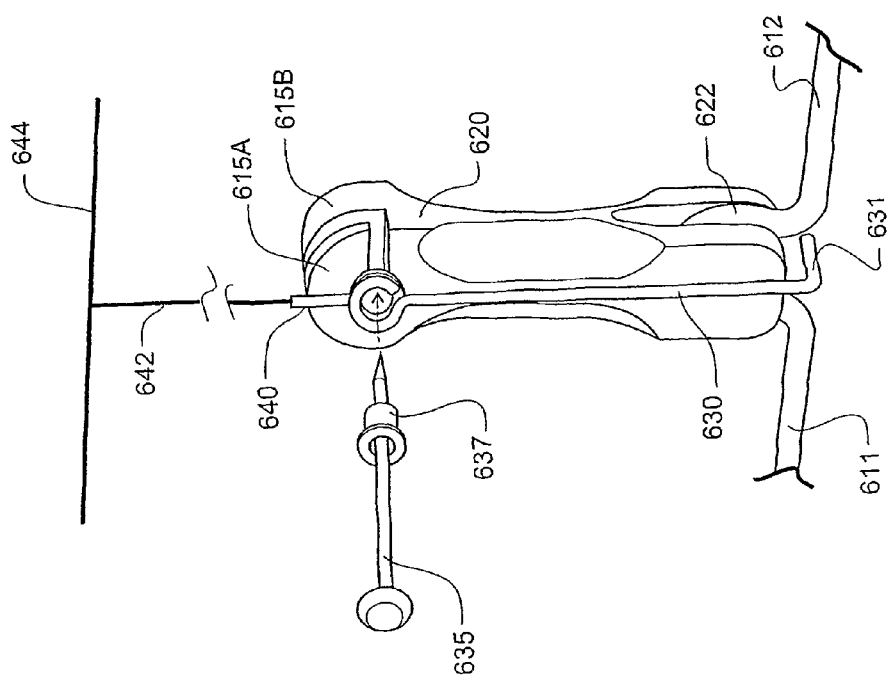

OUTRIGGER

FIELD OF INVENTION

The present invention relates to animal control and in particular to an outrigger for mounting an electrified 'hot wire' or other electric conductor to a fence or other support. The outrigger is suited to the enclosure and control of farmed animals. In use, the outrigger may be supported on a non-electric fence, for example on a fence post or to one of the generally horizontal wires of a post, wire and batten fence. A plurality of the outriggers can be used to convert a non-electric fence into an electrified fence for protecting the fence by deterring stock from pushing against or through the fence. The outrigger may also be used to support electrified conductors for controlling animals in a feeding zone and particularly for reducing the spoilage of feed such as by trampling and contamination by the animals.

BACKGROUND

It is known to offset an electrified conductor from a supporting fence. Various forms of standoffs, outriggers or offsets are mounted to parallel fence wires or to fence posts of a post and batten fence. An insulated pigtail, clip or other retainer, at a distal end of the standoff, outrigger or offset, carries an electric conductor, such as a wire or tape.

Single-sided outriggers carry an electric conductor spaced outwardly at a distance from one side of the fence. Double-sided outriggers carry a pair of electric conductors, with one electric conductor spaced outwardly at a distance from each side of the fence.

When known electric fence outriggers are moved out of position, such as when hit by animals or farm vehicles, the outriggers can remain permanently misshapen or misaligned, thereby reducing, or in some cases removing, the distance that the electrified conductor is offset from the supporting fence. In some cases this can short circuit the electrified conductor to ground potential. This can severely reduce or cancel the effectiveness of the electric fence, not just at the site of the misaligned outrigger but in some cases over a substantial length, or even the entire length, of electric fencing powered from the same fence energiser. It can be a time consuming exercise for farmers to monitor, locate and re-shape or re-align the affected outriggers.

SUMMARY OF INVENTION

An object of at least one embodiment of the invention is to provide an outrigger for supporting an electric conductor, or a method of using an outrigger, or a method of feeding animals using an outrigger, or at least to provide the public with a useful choice.

In a first aspect the invention may be broadly said to be an outrigger for carrying at least one elongate electric conductor at a distance outward from a support, the outrigger comprising:
  a first arm which is elongate and has a proximal end and a distal end,
  a first support device at the distal end of the first arm, and
  a second support device at the proximal end of the first arm, wherein
  the first support device is adapted for suspending a portion of a first elongate electric conductor from the distal end of the first arm,
  the second support device is adapted for suspending the outrigger from a support, and
  the outrigger is adapted so that when the outrigger is suspended from the support by the second support device and the portion of the first elongate electric conductor is suspended from the first support device, the outrigger is movable, from a rest position in which the first arm extends outwardly from the support, to move the first support device and the portion of the first elongate electric conductor toward the support when the first support device or the portion of the first electric conductor is impacted in a direction toward the support, and afterwards to move the outrigger back to the rest position.

Preferably, the outrigger is further adapted so that when the outrigger is suspended from the support by the second support device and is suspending the portion of the first elongate electric conductor from the first support device, the outrigger is rotatable, about an axis substantially parallel to the portion of the first elongate electric conductor, from the rest position, to move the first support device and the portion of the first electric conductor toward the support when the first support device or the portion of the first elongate electric conductor is impacted in a direction toward the support, and afterwards to rotate back to the rest position.

Preferably, the first arm has an abutment portion for abutment against a portion of the support when the outrigger is in use and in the rest position, the abutment portion is located part way between the first and second support devices, and the first arm extends in a first direction from the second support device to the abutment portion, and extends in a second direction not parallel to the first direction from the abutment portion to the first support device.

Alternatively, the first arm extends in a first direction from the second support device to the first support device, and the first arm has an extension which extends in a second direction not parallel to the first direction from the second support device to an abutment portion for abutment against a portion of the support when the outrigger is in use and in the rest position.

Preferably, the outrigger further comprises a second arm which is elongate and extends from the second support device to a distal end of the second awl, and a third support device at the distal end of the second arm, wherein the third support device is adapted for suspending a portion of a second elongate electric conductor from the distal end of the second arm, and the first and second arms are arranged so that the second support device lies between the first and third support devices.

Preferably, the first and second anus are arranged so that the second support device lies between, but not in line with, the first and third support devices.

Alternatively, the outrigger is further adapted so that when
  the outrigger is suspended from the support by the second support device,
  the portion of the first elongate electric conductor is suspended from the first support device, and
  the portion of the second elongate electric conductor is suspended from the third support device, then
  the second support device is rotatable relative to the first and second arms to move the outrigger from the rest position, in which the first and second arms arm extend outwardly from respective opposite sides of the support, to
  either move the first support device and the portion of the first elongate electric conductor toward the support when the first support device or the portion of the first electric conductor is impacted in a direction toward the support, and afterwards to rotate to move the outrigger back to the rest position, or move the third support device and the portion of the second elongate electric conductor toward the support when the third support device or the portion of the second elongate electric conductor is impacted in a direction toward the support, and afterwards to rotate to move the outrigger back to the rest position.

Preferably, the third support device is electrically insulative.

Preferably, the third support device is adapted for gripping the portion of the second elongate electric conductor and thereby resisting sliding movement of the third support device along the second elongate electric conductor.

Preferably, the second elongate electric conductor is a single wire strand, or a multi-stranded wire, or one or more wire strands twisted, braided or woven with non-conductive supporting strands into a rope, tape or braid.

Preferably, the first support device is electrically insulative.

Preferably, the second support device is electrically insulative.

Preferably, the first support device is adapted for gripping the portion of the first elongate electric conductor and thereby resisting sliding movement of the first support device along the first elongate electric conductor.

Preferably, the support is a wire fence and the second support device is adapted for gripping a wire of the fence and thereby resisting sliding movement of the second support device along the fence wire.

Preferably, the first elongate electric conductor is a single wire strand, or a multi-stranded wire, or one or more wire strands twisted, braided or woven with non-conductive supporting strands into a rope, tape or braid.

Preferably, the first support device comprises:
a body which is fitted to the distal end of the first arm of the outrigger, the body having an axis which is generally aligned with the first arm,
first and second extensions which extend transversely from the body in opposite directions, and
a tip portion at the distal end of each of the first and second extensions, each tip portion extending transversely to the extensions in a common direction that is transverse to the body axis, a distal portion of the body extending axially outward beyond the tips.

Preferably, the second support device comprises an electrically insulative body and an electrically conductive switch member, the electrically insulative body and the electrically conductive member each being adapted for swinging about a common pivot axis provided by the support to hang in respective rest positions in which the electrically conductive member is not in contact with either the first or second arm but comes into contact with either the first or second arm when the insulative body is substantially rotated or displaced from its rest position.

In a second aspect the invention may be broadly said to be a method of using an outrigger of the first aspect, or of any of its alternatives or preferences, wherein the outrigger is suspended from the support by the second support device, the portion of the first elongate electric conductor is suspended from the first support device, and the outrigger moves from the rest position to move the first support device and the portion of the first elongate electric conductor toward the support when the first support device or the portion of the first elongate electric conductor is impacted in a direction toward the support, and afterwards moves back to the rest position.

Preferably, the outrigger rotates from the rest position to move the first support device and the portion of the first elongate electric conductor toward the support when the first support device or the portion of the first elongate electric conductor is impacted in a direction toward the support, and afterwards rotates back to the rest position.

In a third aspect the invention may be broadly said to be a method of using an outrigger according to any of the alternatives or preferences of the first aspect that include the second arm, wherein the outrigger is suspended from the support by the second support device, the portion of the first elongate electric conductor is suspended from the first support device, the portion of the second elongate electric conductor is suspended from the third support device, and the outrigger moves from the rest position, to move the first support device and the portion of the first elongate electric conductor toward the support when the first support device or the portion of the first elongate electric conductor is impacted in a direction toward the support, and afterwards moves back to the rest position, or to move the third support device and the portion of the second elongate electric conductor toward the support when the third support device or the portion of the second elongate electric conductor is impacted in a direction toward the support, and afterwards moves back to the rest position.

Preferably, the outrigger rotates from the rest position to move the first support device and the portion of the first electric conductor toward the support when the first support device or the portion of the first electric conductor is impacted in a direction toward the support, or to move the third support device and the portion of the second electric conductor toward the support when the third support device or the portion of the second electric conductor is impacted in a direction toward the support, and afterwards rotates back to the rest position.

In a fourth aspect the invention may be broadly said to be a method of using an outrigger of the first aspect, or of any of its alternatives or preferences, wherein the second support device rotates to move the outrigger from the rest position and to move the first support device and the portion of the first elongate electric conductor toward the support when the first support device or the portion of the first elongate electric conductor is impacted in a direction toward the support, and afterwards to rotate to move the outrigger back to the rest position.

Preferably, the outrigger is returned back to the rest position at least in part by tension in the first elongate electric conductor.

Preferably, the outrigger is returned back to the rest position at least in part by gravity.

Preferably, the support is a wire fence and the outrigger is supported by the second support device from a substantially horizontal wire of the wire fence.

Preferably, the second support device grips the horizontal wire and thereby resists sliding movement of the second support device along the horizontal wire, and the horizontal wire is twisted by rotation of the second support device when the outrigger moves away from its rest position and the outrigger is moved back to the rest position at least in part by torsion in the twisted horizontal wire.

In a fifth aspect the invention may be broadly said to be a method of controlling at least one animal at a feeding zone, the method comprising;
suspending an elongate electric conductor from a respective first support device at the distal end of the first arm of one or more outriggers each as defined above as the first aspect of the invention, or of any of its alternatives or preferences,
suspending the elongate electric conductor adjacent the feeding zone, and
electrifying the elongate electric conductor, and thereby deterring the animal or animals from spoiling feed located at the feeding zone prior to consumption of the feed by the animal or animals.

Preferably, the elongate electric conductor is suspended above the feeding zone at a height that deters animals feeding at the feeding zone from substantially raising their heads above a feeding posture.

In a sixth aspect the invention may be broadly said to be a method of controlling at least one animal at a feeding zone, the method using at least one outrigger according to any of the alternatives or preferences of the first aspect that include the second arm, wherein at least one elongate electric conductor is suspended from each of the first and second support devices at respective distal ends of the first and second arms of the at least one outrigger, and wherein the at least one elongate electric conductor is suspended above the feeding zone at a height that deters animals feeding at the feeding zone from substantially raising their heads above a feeding posture.

The invention may further be said to consist in any alternative combination of parts or features mentioned herein or shown in the accompanying drawings. Known equivalents of these parts or features which are not expressly set out are nevertheless deemed to be included.

In this specification, the terms "outrigger", "offset" and "standoff", when used as nouns, are to be understood as equivalent terms for a device that can be supported on a suitable supporting structure, for example a fence, for carrying an electric conductor at a distance from one side of the supporting structure.

The term 'comprising' as used in this specification and claims means 'consisting at least in part of', that is to say when interpreting statements in this specification and claims which include that term, the features, prefaced by that term in each statement, all need to be present but other features can also be present.

BRIEF DESCRIPTION OF THE DRAWINGS

Preferred embodiments and methods of utilising the invention will be further described, with reference to the accompanying figures, by way of example only and without intending to be limiting, wherein;

FIG. 14 shows details of an outrigger hanger with a switch for controlling electrical connection to the suspended outrigger; and FIG. 15 shows details of an outrigger hanger with an alternative switch for controlling electrical connection to the suspended outrigger.

DETAILED DESCRIPTION OF PREFERRED EMBODIMENTS

Referring to the figures it will be appreciated that the invention may be implemented in various forms and modes. The following description of preferred embodiments of the invention is given by way of example only.

FIGS. 1, 2, 5, 6, 8 and 9 each show a side view of an outrigger fitted to a fence, as seen looking along the line of the supporting fence to which the outrigger is attached. FIGS. 3, 4, 7, 11, 12 and 13 each show a perspective view of an outrigger fitted to a fence. In each case some components of the supporting fence are omitted for clarity.

Figure 1:
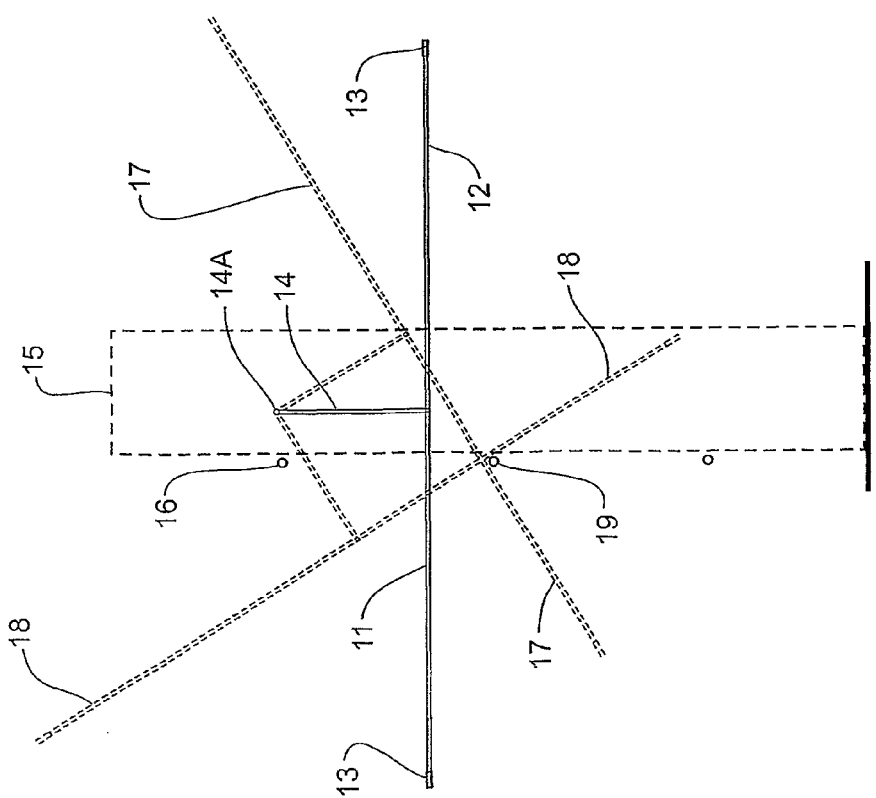
FIG. 1 shows a side view of a first double-ended outrigger fitted to a fence.

FIG. 1 shows a side view of a double-ended electric fence outrigger in accordance with the invention. The outrigger is mounted to a supporting fence and is used to carry two electric fence conductors, with one of the conductors being offset from each side of the supporting fence.

The outrigger has a first elongate aim 11 and a second elongate aim 12 extending in opposite directions from proximal ends of the anus at a common central support 14. A support clip 13 is fitted to each distal, i.e. outer, end of the first and second arms 11, 12. The support clips 13 are adapted for supporting an electric fence conductor (not shown) at the distal ends of the anus 11, 12.

The central support 14 pivotally supports the outrigger to an upright fence post 15 of a supporting fence and allows the outrigger to rotate about the axis 14A of the support, the axis being substantially parallel to the fence line.

The pivotal support axis 14A may be provided by a nail or other similar fastener that is driven into or otherwise secured to a post, or a batten in lieu of a post, of the supporting fence. In an alternative arrangement (not shown in FIG. 1), the pivot secures the common central support 14 to a generally horizontal fence wire 16 that is attached to the post 15. In this case the pivot axis is provided by the fence wire 16.

When two similar electric fence wires are supported respectively in the clips 13 at the two outer ends of the double-ended outrigger of FIG. 1, the outrigger hangs from the central support 14 about pivot axis 14A with the arms 11, 12 extending outwardly from opposite sides of the supporting fence with the arms lying approximately horizontal as is shown by solid lines in FIG. 1.

The pivotal central support 14 permits free rotation of the outrigger about the pivot axis 14A so that if an object on one side of the supporting fence pushes against one end of the outrigger, or against one of the electric fence conductors carried by the outrigger, the outrigger can rotate in either direction to move the electric fence conductor and the outer end of the outrigger inward toward that side of the supporting fence. The outrigger rotates freely without flexing.

FIG. 1 shows, in broken lines, the outrigger in position 17 when the outer end of the arm 11 is pushed down and toward the left side of the fence, or the outer end of the other arm 12 is pushed up and toward the right side of the fence. FIG. 1 also shows, in broken lines, the outrigger in position 18 when the outer end of the aim 11 is pushed up toward the left side of the fence, or when the outer end of the other arm 12 is pushed down and toward the right side of the fence.

When the object ceases pushing against the electric fence conductor or outrigger, the outrigger swings back under the combined effects of gravity and the tension of the electric conductor to the original outrigger rest position as shown in solid lines.

When the outrigger of FIG. 1 is fitted to a supporting fence having wires additional to any wire, e.g. wire 16, used for the pivotal support, the maximum deflection of the outrigger may be limited by abutment of an arm of the outrigger against one or more of the additional wires. For example, the maximum swing of the outrigger arm may be limited to the outrigger positions 17, 18, shown in broken lines in FIG. 1, in which the lower arm of the outrigger abuts the additional wire 19 of the supporting fence.

Figure 2:
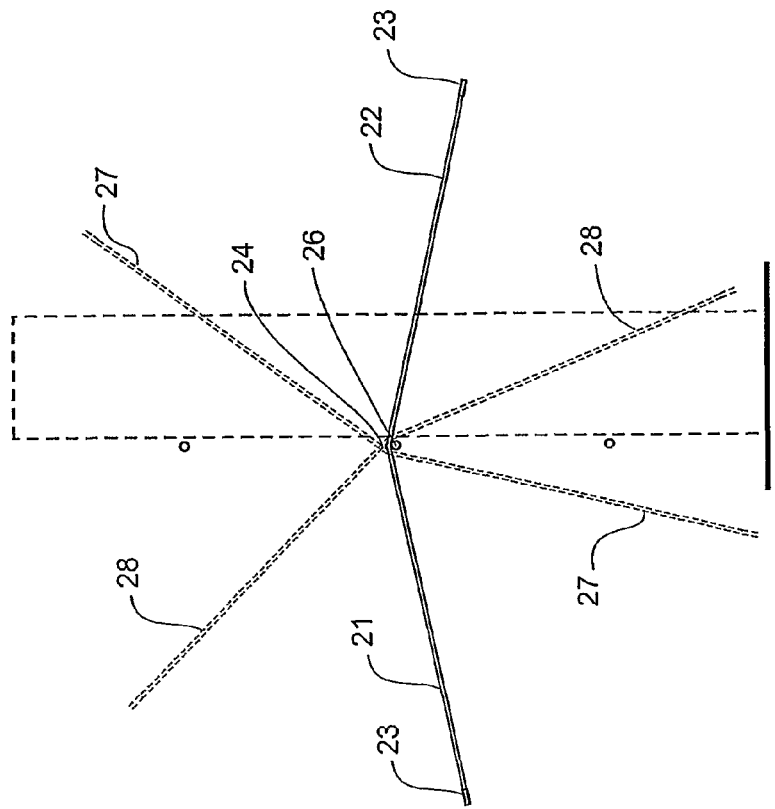
FIG. 2 shows a side view of a second double-ended outrigger fitted to a fence.

FIG. 2 shows a side view of a second double-ended outrigger in accordance with the invention. This outrigger has a first elongate arm 21. A second elongate arm 22 extends from a proximal end of the first arm. As in the embodiment of FIG. 1, a support clip 23 is fitted to each outer end of the first and second arms 21, 22 for securing an electric fence conductor (not shown) to the distal ends of the arms 21, 22.

The outrigger has a central support 24 where the proximal ends of the first and second arms 21, 22 meet. The support 24 pivotally supports the outrigger at proximal ends of the first and second arms 21, 22 by attachment to a wire 26 of a supporting fence with the pivot axis substantially parallel to the supporting fence wire.

When two similar electric fence conductors are supported respectively in the support clips 23 at the two outer ends of the double-ended outrigger of FIG. 2, the outrigger hangs from the fence wire 26 at the pivotal support 24. The arms 21, 22 extend outwardly from opposite sides of the supporting fence with the arms hanging downward as is shown by solid lines in FIG. 2.

The pivot 24 permits free rotation of the outrigger so that if an object on one side of the supporting fence pushes against one of the outrigger arms, or against one of the electric fence conductors carried by the outrigger, the outrigger arm can rotate. For example, an outrigger arm can be pushed downward to move the electric fence wire and the outer end of that outrigger arm inward toward that side of the supporting fence. The outrigger rotates freely without flexing the outrigger.

FIG. 2 shows, in broken lines, the outrigger in position 27 when the arm 21 is pushed down toward the left side of the fence or when the arm 22 is pushed up toward the right side of the fence. FIG. 2 also shows, in broken lines, the outrigger in position 28 when the arm 21 is pushed up toward the left side of the fence or when the arm 22 is pushed down toward the right side of the fence.

When the pushing against the electric fence conductor or the outrigger ceases, the outrigger swings back under the combined effects of gravity and the tension of the electric conductor to the original undisturbed outrigger rest position as shown in solid lines.

In the arrangement shown in FIG. 2, each outrigger arm rotates freely and without flexing when pushed down, to be flush with the supporting fence.

In each of the double-ended outriggers shown in FIGS. 1 and 2 the arms 11, 12, 21, 22 are arranged so that the pivot 14, 24 lies between, but not in line with, the support clips 13, 23 at the distal ends of the two arms. These outriggers are mounted to the supporting fence with the support clips lower than the pivot when the outrigger is in the un-disturbed rest position.

Figure 3:
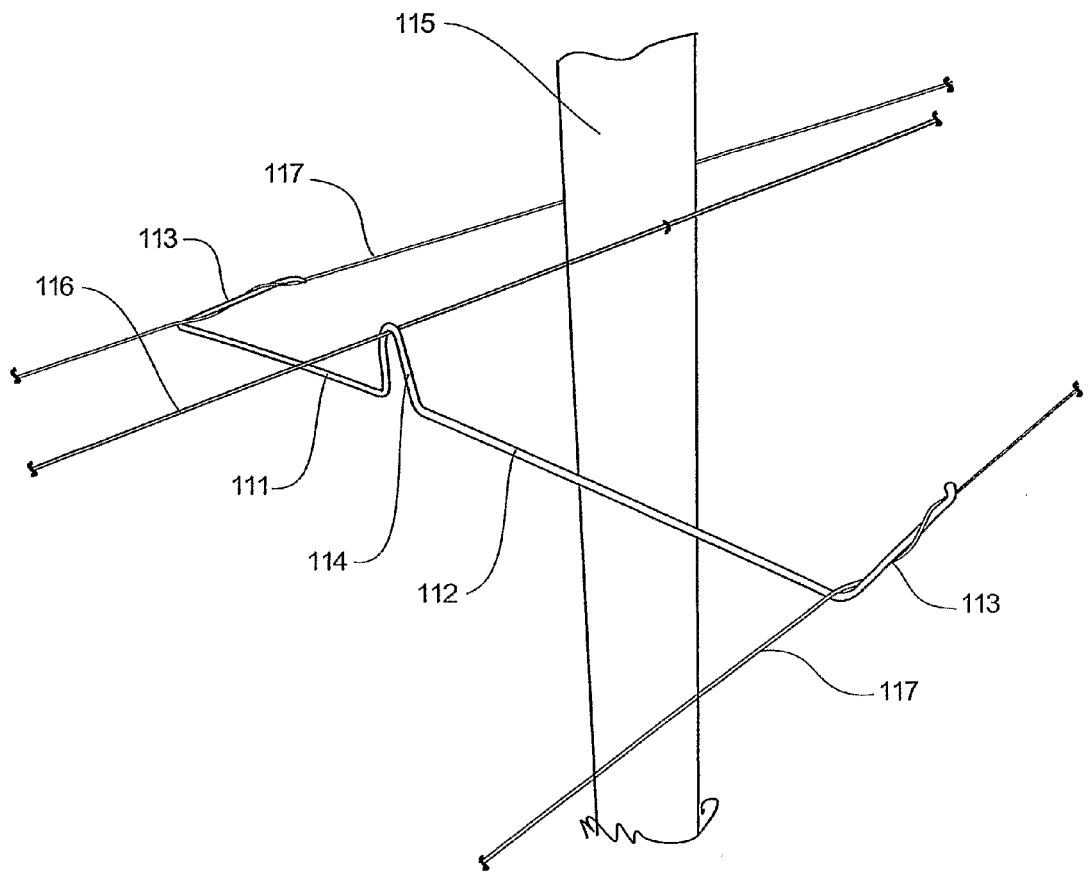
FIG. 3 shows a perspective view of a third double-ended outrigger fitted to a fence.

FIG. 3 shows a perspective view of a double-ended outrigger in accordance with the invention. The outrigger has two arms 111, 112 which extend in opposite directions from a simple central hanging loop support 114 at the proximal ends of the two arms. The outrigger hangs freely, by the central support 114, on a horizontal wire 116 of a post and batten fence. One post 115 of the fence is shown in FIG. 3. The distal ends 113 extend approximately at right angles to the respective aims 111, 112. The distal ends are approximately parallel to one another and can extend in the same direction as one another, as is shown in FIG. 3, or can extend in opposite directions (not shown in the figures). Each of the distal ends 113 of the arms 111, 112 and a respective elongate electric wire 117 are twisted about one another to provide a gripping engagement that resists sliding movement of the twisted distal ends 113 of the arms along the respective electric wires 117. The outrigger is preferably formed from a steel wire with the distal ends of the arms 111, 112 or the central support 114 coated with an electrically insulating material (not shown).

Figure 4:
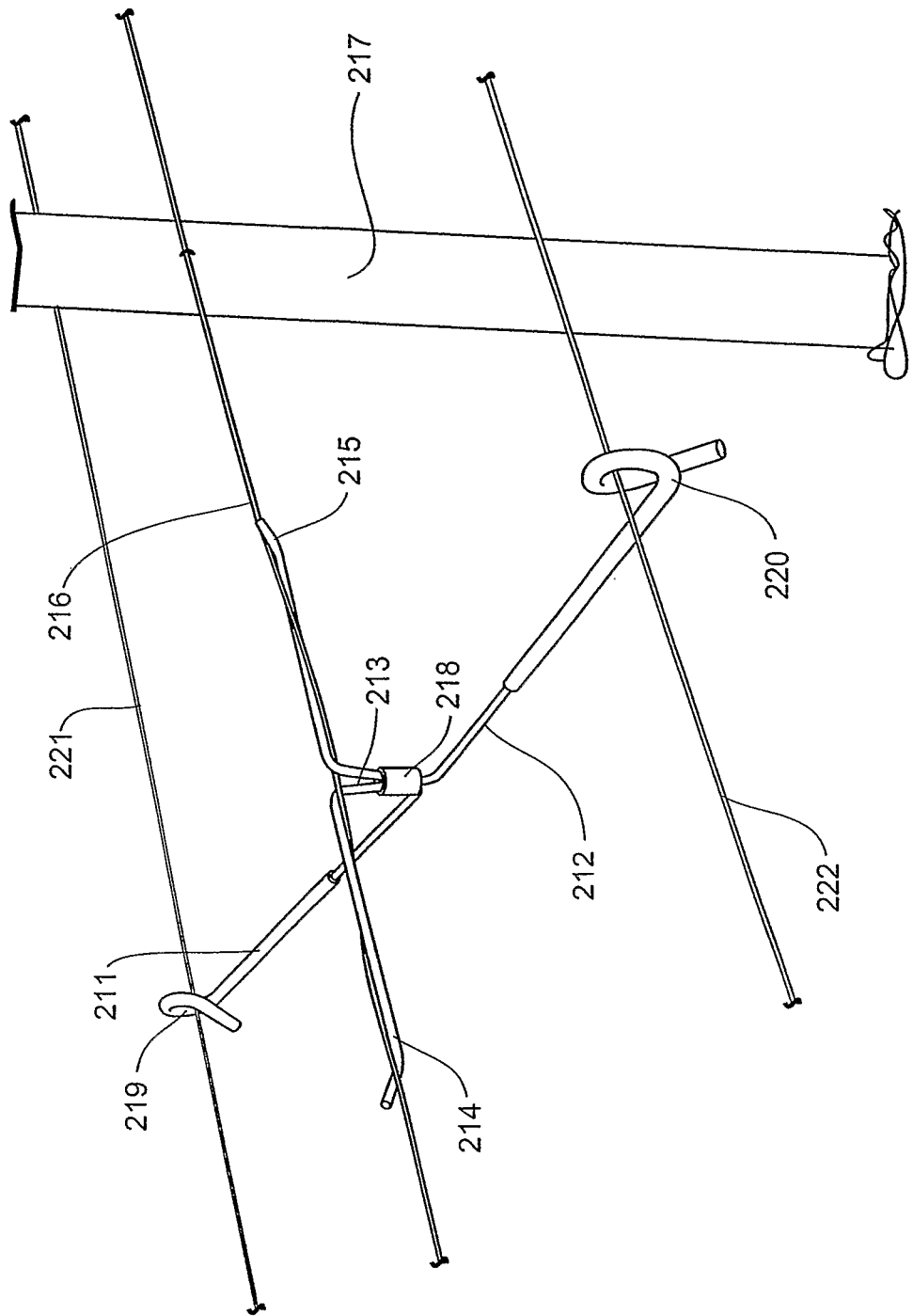
FIG. 4 shows a perspective view of a fourth double-ended outrigger fitted to a fence.

FIG. 4 shows a perspective view of a double-ended outrigger in accordance with the invention. The outrigger has two arms 211, 212 which extend in opposite directions from a central support 213 at the proximal ends of the two arms. The central support has two tails 214, 215 which extend transversely to the two outrigger arms. The two tails are twisted about a horizontal wire 216 of a post and batten fence to provide a gripping engagement that resists sliding movement of the twisted tails 214, 215 of the central support 213 along the fence wire 216. One post 217 of the fence is shown in FIG. 4. The outrigger is preferably formed from a pair of steel wires, held together by a crimped sleeve 218. Pigtails 219, 220 at the distal ends of the arms 211, 212 support respective electric fence wires 221, 222 outwardly from opposite sides of the fence. The pigtails are covered with an electrically insulating sleeve or coating. In an alternative not shown in FIG. 4, the tails 214, 215 of the central support 213 may be covered with an electrically insulating sleeve or coating.

Figure 5:
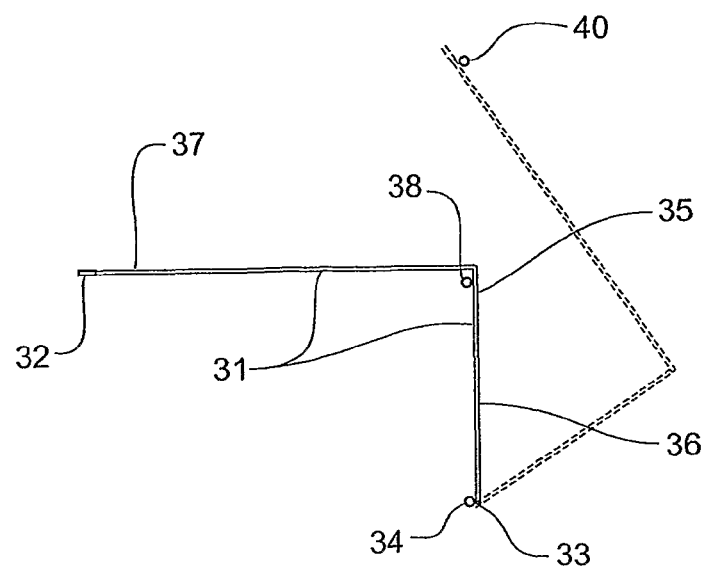
FIG. 5 shows a side view of a first single-ended outrigger fitted to a fence.
Figure 6:
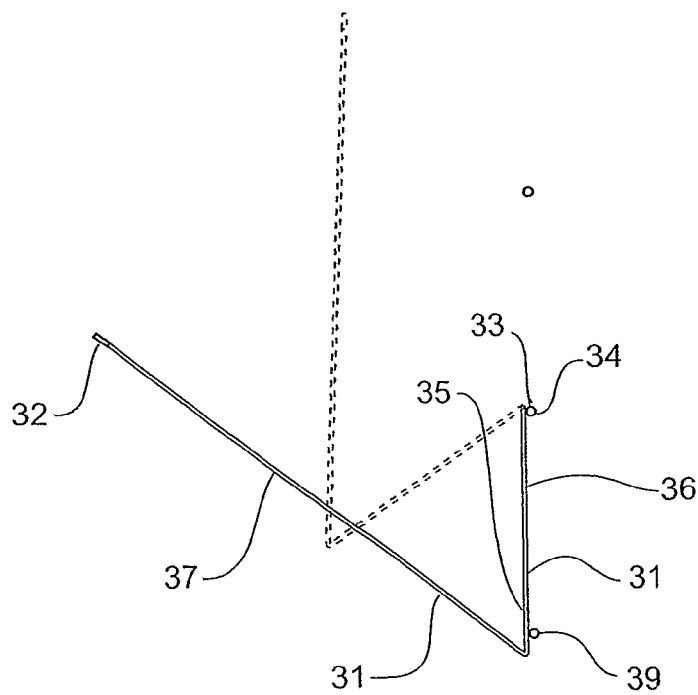
FIG. 6 shows a side view of a second single-ended outrigger fitted to a fence.

FIGS. 5 and 6 show side views of single-ended outriggers in accordance with the invention. These outriggers can be attached to a supporting fence for carrying an electric fence conductor offset from one side of the supporting fence. The outriggers each have an elongate arm 31. A support clip 32 is fitted to a distal end of the arm 31. The support clip 32 is adapted for supporting an electric fence conductor (not shown) to the distal end of the arm 31.

The outriggers of FIGS. 5 and 6 each have a pivotal support 33 at a proximal end of the arm 31. The pivotal support 33 supports the outrigger at the proximal end of the arm 31 to a wire 34 or fence post (not shown) of a supporting fence and allows the outrigger to rotate about the axis of the pivotal support which is substantially parallel to the fence line.

In the outriggers of FIGS. 5 and 6, the arm 31 has an abutment portion 35 located between the pivotal support 33 and the clip support 32. The arm has a first length portion 36 which extends in a first direction from the pivotal support to the abutment portion 35, and a second length portion 37 which extends in a second direction not parallel to the first direction from the abutment portion 35 to the support clip 32 at the distal end.

When an electric fence conductor (not shown) is supported by the support clip 32 at the outer end of the single-ended outrigger arm 31, the weight of the conductor, or tension in the conductor, rotates the outrigger (anti-clockwise as seen in FIGS. 5 and 6) until the abutment portion 35 abuts against a wire of the supporting fence. In the embodiment of FIG. 5, this wire 38 is higher than the wire 34 to which the pivotal support 33 is attached.

In the embodiment of FIG. 6, this wire 39 is lower than the wire 34 to which the pivot 33 is attached. When the outrigger is in this undisturbed rest position, the second length portion 37 of the outrigger arm extends outwardly from one side of the supporting fence. Preferably the second length portion 37 of the arm is then approximately horizontal, as is shown by solid lines in FIG. 5, or rises outwardly, as is shown by solid lines in FIG. 6.

The arms of the outriggers shown in FIGS. 5 and 6 can have an L-shape. The two limbs of the L-shape can be arranged perpendicularly to one another (e.g. as in FIG. 5), or at a lesser angle (e.g. as in FIG. 6), or at a greater angle. It is preferable that when the outrigger is in the undisturbed rest position, with the abutment portion 35 abutting against the fence wire 38, 39, the support clip 32 is higher than the pivot 33 so that a horizontal force directed inwardly against the electric fence conductor or outrigger arm tends to lift and rotate the arm upward.

The pivotal support 33 permits free rotation of the outrigger so that if an object on the left side of the supporting fence (as seen in FIGS. 5 and 6) pushes against the outrigger arm, or against the electric fence conductor carried by the outrigger, the outrigger arm can rotate upward without flexing to move the electric fence conductor and the outer end of the outrigger arm upward and inward toward that side of the supporting fence.

FIGS. 5 and 6 show, in broken lines, the outrigger when the arm is pushed toward the fence. When the pushing against the electric fence conductor or the outrigger ceases, gravity and/or tension of the electric conductor swings the outrigger back to the original undisturbed rest position shown in solid lines.

In the embodiment shown in FIG. 5, the outrigger arm can rotate freely upward and without flexing until it is restrained by contact with a higher wire 40 of the supporting fence.

Figure 7:
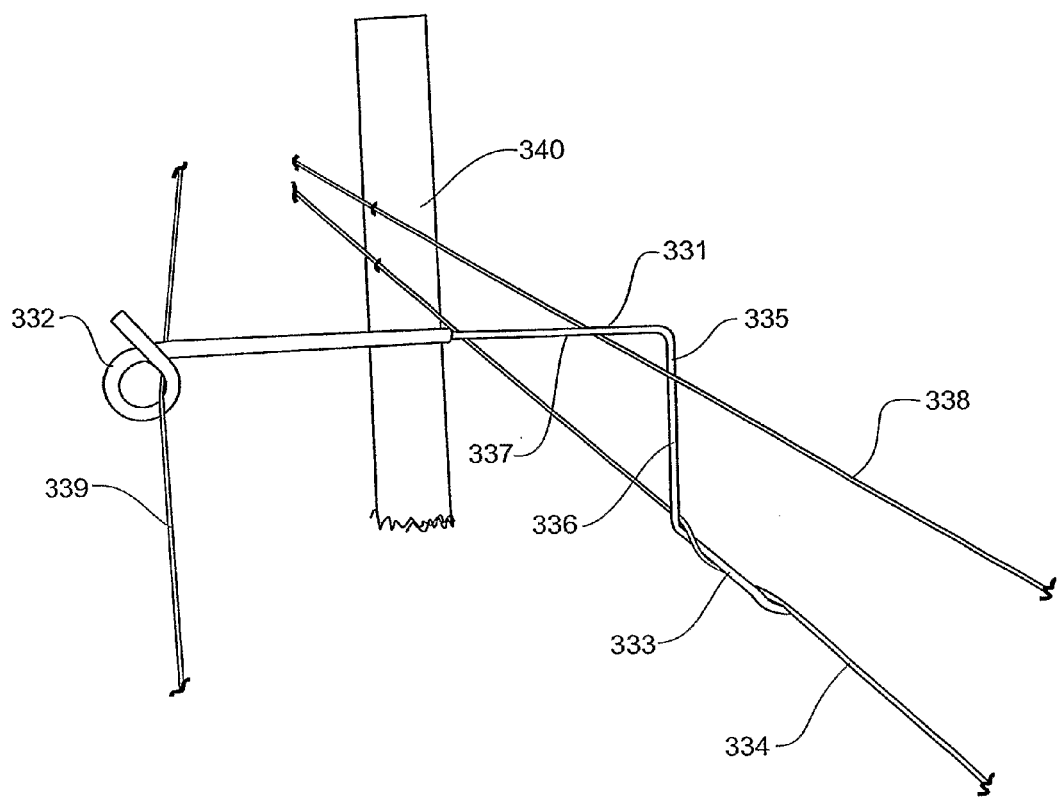
FIG. 7 shows a perspective view of a third single-ended outrigger fitted to a fence.

FIG. 7 shows a perspective view of one preferred single-ended outrigger in accordance with the invention. The outrigger has an elongate arm 331. The distal end of the arm 331 is fowled with a pigtail 332 for supporting an electric fence wire 339 at the distal end of the arm. A pivotal support 333 at a proximal end of the arm 331 supports the outrigger from a wire 334 of a supporting fence and allows the outrigger to rotate about the axis of the pivotal support. The pivotal support 333 is formed by twisting the supporting fence wire 334 about a return portion at the distal end of the outrigger. The supporting fence wire 334 provides the axis for the pivotal support 333 and twists to allow the outrigger to rotate relatively freely and without flexing. The supporting fence wire 334 is one of several horizontal wires of a post and batten fence and is supported by a series of fence posts. One such fence post 340 is shown in FIG. 7.

The outrigger arm 331 has an abutment portion 335 located between the pivotal support 333 and the pigtail 332. The arm has a first length portion 336 which extends in a first direction from the pivotal support 333 to the abutment portion 335, and a second length portion 337 which extends in a second direction, which is substantially perpendicular to the first direction, from the abutment portion 335 to the pigtail 332 at the distal end.

When the electric fence wire 339 is supported by the pigtail 332 at the outer end of the single-ended outrigger arm 331, the weight of or tension in, the electric wire, rotates the outrigger (anti-clockwise as seen in FIG. 7) until the abutment portion 335 abuts against a wire 338 of the supporting fence. In the embodiment of FIG. 7, this wire 338 is higher than the wire 334 supporting the pivotal support 333. When the outrigger is in this undisturbed rest position, the second length portion 337 of the outrigger arm extends substantially horizontally outward from one side of the supporting fence.

The pivotal support 333 permits free rotation of the outrigger so that if an object on the left side of the supporting fence (as seen in FIG. 7) pushes against the outrigger arm, or against the electric fence wire 339 carried by the outrigger, the outrigger arm can rotate upward without flexing to move the electric fence wire and the pigtail 332 at the outer end of the outrigger arm upward and inward toward that side of the supporting fence. The outrigger is returned to its rest position (as shown in FIG. 7) under one or more of gravity, or tension in the electric fence wire 339, or torsion in the supporting fence wire 334.

Figure 8:
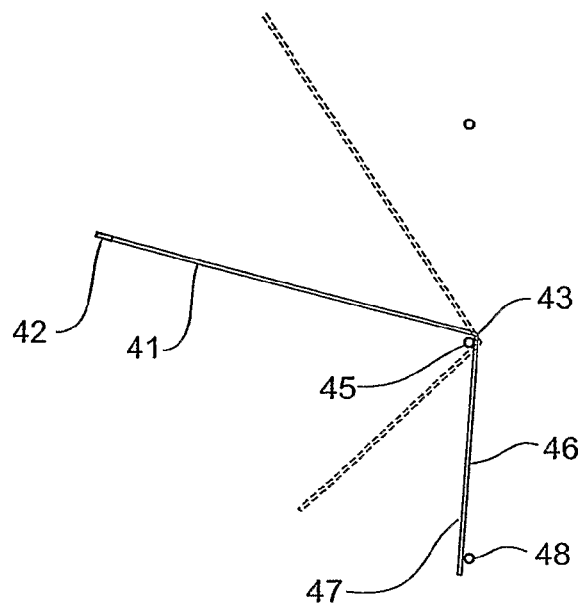
FIG. 8 shows a side view of a fourth single-ended outrigger fitted to a fence.
Figure 9:
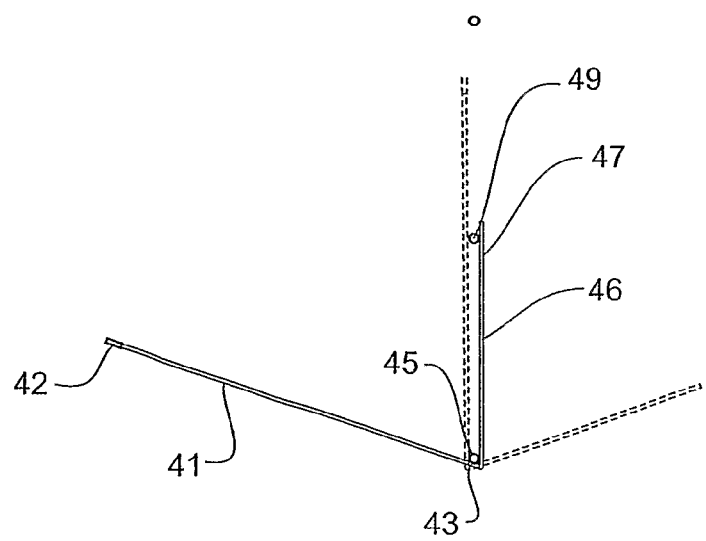
FIG. 9 shows a side view of a fifth single-ended outrigger fitted to a fence.

FIGS. 8 and 9 show side views of single-ended outriggers in accordance with the invention. These outriggers can be attached to a supporting fence for carrying an electric fence conductor offset from one side of the supporting fence. The outriggers each have an elongate arm 41. A support clip 42 is fitted to a distal end of the arm 41. The support clip 42 is adapted for supporting an electric fence conductor (not shown) at the distal end of the arm 41.

The outriggers of FIGS. 8 and 9 each have a pivotal support 43 at a proximal end of the arm 41. The pivotal support 43 secures the arm 41 to a wire 45 or fence post (not shown) of a supporting fence and allows the outrigger to rotate about the axis of the pivotal support, which axis is substantially parallel to the fence line.

The outriggers of FIGS. 8 and 9 have an extension 46 which extends from the pivotal support 43 at the proximal end of the arm 41. The arm extends in a first direction from the pivotal support to the support clip and the extension extends from the pivotal support in a second direction not parallel to the first direction. The extension 46 has an abutment portion 47 located at a distance from the pivotal support 43.

When an electric fence conductor is supported by the support clip 42 at the outer end of the single-ended outrigger arm 41, the weight of the conductor, or tension in the conductor, rotates the outrigger (anti-clockwise as seen in FIGS. 8 and 9) until the abutment portion 47 abuts against a wire of the supporting fence. In the embodiment of FIG. 8, this wire 48 is lower than the wire 45 to which the pivotal support 43 is attached. In the embodiment of FIG. 9, this wire 49 is higher than the wire 45 to which the pivotal support 43 is attached. When the outrigger is in this undisturbed rest position, the arm 41 of the outrigger arm extends outwardly from one side of the supporting fence. Preferably the arm 41 extends outwardly and upwardly from the pivotal support 43, as is shown by solid lines in FIGS. 8 and 9.

The outriggers shown in FIGS. 8 and 9 have an L-shape. The two limbs of the L-shape are preferably arranged at a greater or lesser angle to one another so that when the outrigger is restrained in the un-disturbed rest position, the support clip 42 is higher than the pivotal support 43 so that a horizontal force directed inwardly against the electric fence conductor or outrigger arm tends to lift and rotate the arm upward.

The pivotal support 43 permits free rotation of the outrigger so that if an object on the left side of the supporting fence (as seen in FIGS. 8 and 9) pushes against the outrigger arm, or against the electric fence conductor carried by the outrigger, the outrigger arm can rotate upward without flexing to move the electric fence conductor and the outer end of the outrigger arm upward and inward toward that side of the supporting fence.

FIGS. 8 and 9 show, in broken lines, the outrigger when the arm is pushed toward the fence. When the object ceases pushing against the outrigger or the electric fence conductor, the outrigger swings back to its undisturbed rest position, shown in solid lines, under the influence of gravity and/or tension of the electric conductor.

In the embodiment shown in FIG. 8, the outrigger arm 41 can rotate freely upward until it is flush with the fence wires of the supporting fence, leaving no substantial part of the outrigger extending outwardly from the side of the fence opposite the side at which the electric fence conductor is carried by the outrigger.

In the embodiment shown in FIG. 9, the outrigger arm can rotate freely upward until it is flush with the fence wires of the supporting fence, leaving no substantial part of the outrigger extending outwardly from the side of the fence at which the electric fence conductor is carried by the outrigger.

The outrigger arms can be secured to, but not rigidly attached to, the supporting fence by the pivotal supports. The pivotal supports can be a two-part hinge with one hinge part attached to an arm of the outrigger and the other hinge part attached to the supporting fence. Alternatively, the pivot can be a clip that is snap-fitted about a wire of the supporting fence so that the fence wire itself provides the pivot axis. The pivot can fit loosely about the fence wire so that the outrigger arm can freely rotate about the axis provided by the supporting fence wire, as may be seen in the pivotal support 114 of FIG. 3. Alternatively, the pivotal support can grip the fence wire, for example as seen in the pivotal supports shown in FIGS. 4 and 7. When the pivotal support grips the fence wire, rotation of the outrigger twists the fence wire. The resulting torsion in the fence wire aids return of the outrigger to its undisturbed rest position. The hinge or pivotal support is preferably arranged to hold the outrigger arm at least approximately perpendicular to the supporting fence wire.

The attachment of the outrigger to the supporting fence allows the outrigger arm or arms to move when disturbed, from a rest position at which an electric fence conductor carried by the outrigger arm is held outward from the supporting fence, to a position closer to the fence, and to return to the undisturbed rest position by any one or more of gravity acting on the outrigger, gravity acting on the electric conductor supported by the outrigger, tension in the electric fence conductor, and torsion in a supporting fence wire to which the outrigger arm is attached.

Figure 10:
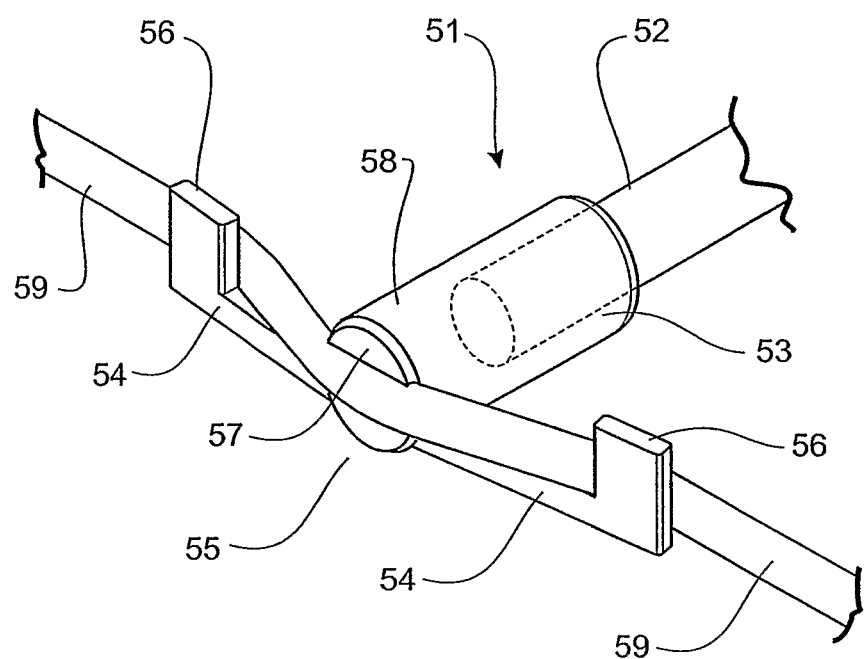
FIG. 10 shows a perspective view of an attachment device fitted to the distal end of an outrigger arm.

FIG. 10 shows a perspective view of one preferred embodiment of a support clip 51 fitted to the distal end of an outrigger arm 52. The clip has a tubular body 53 with an open end. The tubular body is fitted over a distal end portion, shown in broken lines in FIG. 7, of the outrigger arm with the axis of the tubular body at least approximately aligned with distal portion of the outrigger arm. Two extensions 54 extend transversely from a first side 55 of the body in opposite directions. Each extension 54 has a tip 56 which extends transversely to both the extension and the axis of the tubular body. Both tips extend in a common direction. A portion 57 of the distal end of the tubular body extends from a second side 58 of the body, opposite the first side 55, and in an axial direction beyond the tips 56.

As shown in FIG. 10, the two extensions 54 extend transversely from the bottom side 55 of the tubular body 53 and the distal end portion 57 extends axially from the top side 58 of the tubular body. The tips 56 extend upwardly, in a direction that is transverse to the extensions 54 and to the tubular body 53.

An electric fence conductor 59 is passed behind the tips 56, over the extensions 54 and under the distal portion 57. The clip 51 can grip the conductor 59 by forcing the conductor to deviate from a straight path through the clip. Alternatively, the clip extensions 54 can flex to allow the conductor to pass through the clip in a straight line. In either case the clip supports and grips the conductor to resist free sliding movement of the conductor through the clip.

An alternative support clip arrangement may be seen in FIGS. 4 and 7 which show the ends of the outrigger arms formed into pigtails for loosely supporting an electric fence wire. When the outrigger is fashioned from an electrically conductive material, for example a metal rod or wire, the pigtails are preferably electrically insulated, for example by an insulating sleeve or coating.

Figure 11:
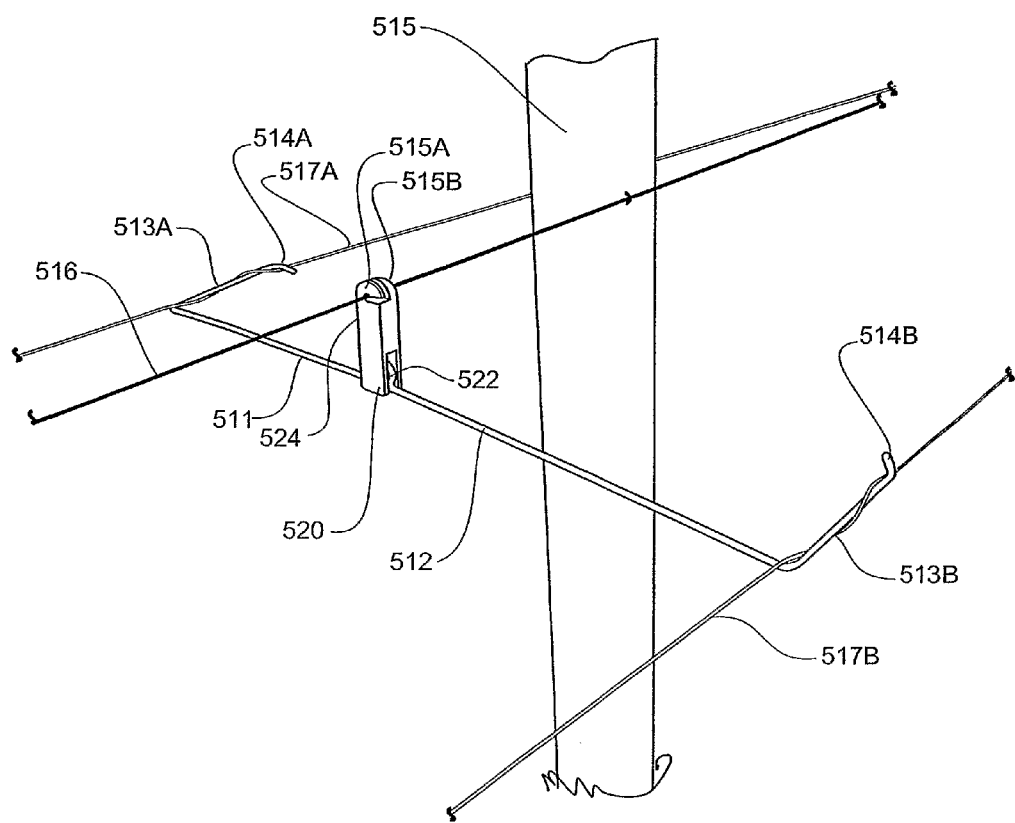
FIG. 11 shows a first perspective view of a fifth double-ended outrigger fitted to a fence.
Figure 12:
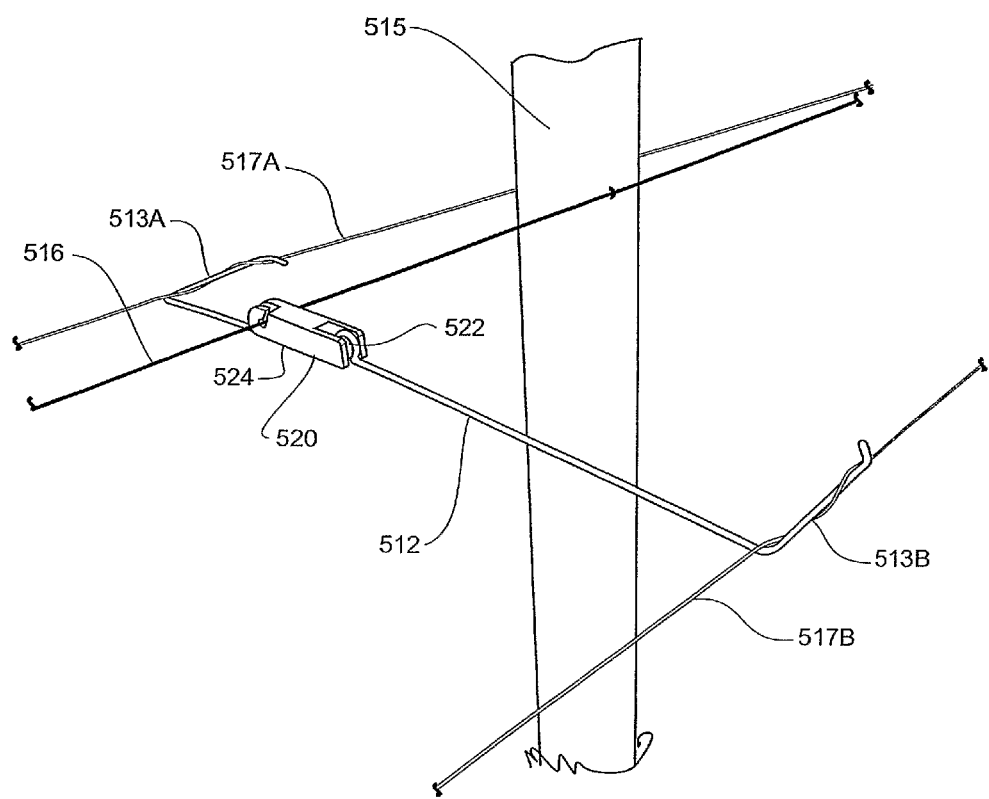
FIG. 12 shows a second perspective view of the fifth double-ended outrigger of FIG. 11 fitted to a fence.
Figure 13:
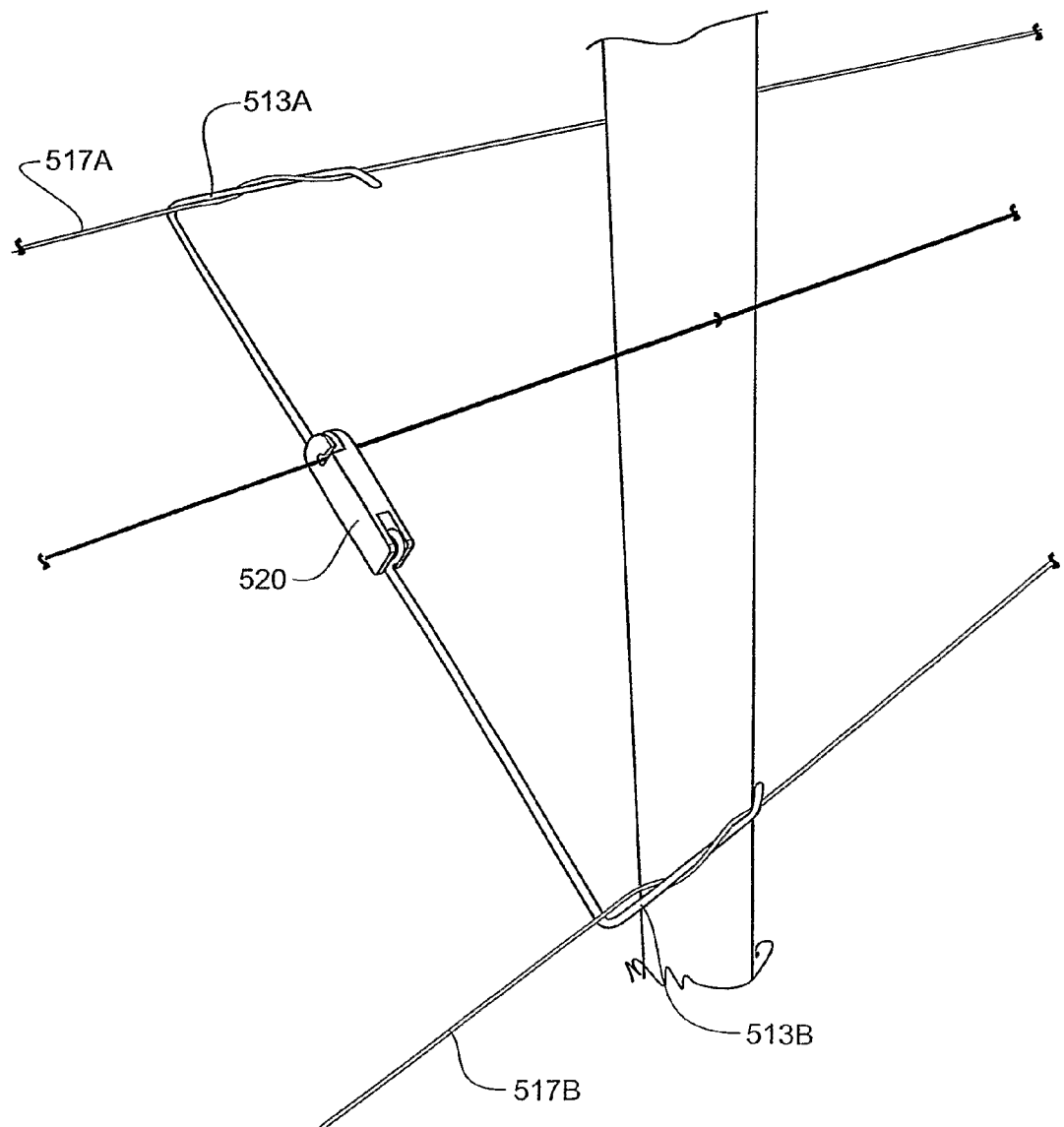
FIG. 13 shows a third perspective view of the fifth double-ended outrigger of FIGS. 11 and 12 fitted to a fence.

FIGS. 11, 12 and 13 show three perspective views of a fifth double-ended outrigger, in accordance with the invention. The double-ended outrigger has two arms 511, 512 that support electric conductors or wires 517A, 517B. The wires are held at a distance offset outward from respective opposite sides of a supporting wire 516 carried on a post 515. In one application the supporting wise is one wire of a post, wire and batten fence.

The two arms 511, 512 extend outward in opposite directions from their proximal ends at a centrally located open pivot loop 522. The distal end portions 513A, 513B of the two arms are bent approximately at right angles to the main portions of the arms for grippingly engaging two electric conductors which are wrapped around the respective end portions. The distal end portions are approximately parallel to one another and can extend in the same direction as one another, as is shown in FIGS. 11, 12 and 13, or can extend in opposite directions (not shown in the figures). A distal tip 514A, 514B of each end portion may be bent slightly inward to help retain the electric wire 517A, 517B wrapped around the end portion 513A, 513B. The central loop 522, the two outrigger arms 511, 512, the two distal end portions 513A, 513B of the arms and the tips 514A, 514B may all be provided by a single length of wire.

The outrigger includes a central hanger 520. The upper end of the hanger is bifurcated, with a pair of oppositely-directed inverted J-shaped hooks 515A, 515B. The hooks are spaced apart so that, during installation of the hanger, a support wire 516 of a supporting fence can be located between the two hooks. During installation of the hanger onto a support wire, the hanger 520 is positioned with the support wire 516 passing between the two hooks 515A, 515B. The hanger is then rotated through about 90° to simultaneously engage each of the two hooks over the support wire. In this position, the hanger can freely pivot about an upper hanger axis that is provided by the support wire fitted into the two hooks.

The lower end of the hanger 520 is bifurcated, having a pair of spaced-apart walls, with a pivot axle extending between the two walls. The centrally-located pivot loop 522 has a downwardly-open C-shape allowing the hanger axle to be snap-fitted into the loop. The lower end of the hanger is threaded onto the outrigger and the axle engaged inside the centrally-located loop 522. The hanger can freely rotate, relative to the outrigger arms 511, 512, about a lower hanger pivot axis that is provided by the axle fitted into the C-shaped loop 522.

The hanger 520 is hooked onto a generally horizontal wire 516 of a support fence.

Each hook 515A, 515B provides a through-hole for fitting about the support wire. In a preferred embodiment, the through-hole has a diameter that is a loose fit on the support wire so that the hanger can rotate freely about the axis provided by the support wire. Each through-hole opens at a slot. The slots have a width that is slightly smaller than the diameter of the support wire so that the hooks are snap-fitted over the support wire to help to captively retain the hanger on the wire. In this case, the hanger is made sufficiently resilient so that the slots can be opened sufficiently to accommodate the wire when the wire is forced through the slot and into the through-holes.

Alternatively, the outrigger may be supported on a nail or other similar fastener that is driven into or otherwise secured to a post, or a batten in lieu of a post, of the supporting fence.

In this arrangement, the through-hole provided by the hooks has a diameter that is a loose fit on the nail or fastener so that the hanger can rotate freely about the upper hanger axis that is provided by the nail or fastener.

Each of the distal ends 513A, 513B of the outrigger arms 511, 512 and a respective elongate electric wire 517A, 517B are wrapped or twisted one about the other to provide a gripping engagement that resists sliding movement of the twisted distal ends 513A, 513B of the arms along the respective electric wires 517A, 517B.

Electrical isolation between the support wire 516 and the electric wires 517A, 517B supported at the distal ends 513A, 513B of the outrigger arms may be provided by covering each of the distal ends 513A, 513B with an electrically insulating sleeve or coating (not shown).

Alternatively and preferably, the electrical isolation is provided by making the body of the hanger 520 from an electrically insulating material, for example from a plastics material. In one preferred embodiment, the hanger is shaped as described above and moulded in one piece from a low density polyethylene.

FIG. 11 shows the double-ended outrigger in a rest position with the arms generally horizontal and supporting the electrified wires 517A, 517B offset outward from respective opposite sides of a supporting wire 516 carried on post 515.

FIG. 12 shows the double-ended outrigger of FIG. 11 in an impacted position. When the electrified wires 517A, 517B, or the outer or distal end portions 513A, 513B of the arms, are impacted in an inward direction toward the supporting wire 516, the hanger 520 rotates about the axis that is provided by the supporting fence wire 516 passing through the apertures in the two hooks 515A, 515B. The hanger also rotates relative to the outrigger anus 511, 512, about the axis provided by the axle fitted in the central C-shaped loop 522. The rotation of the hanger allows the impacted end portion 513A, 513B of an outrigger arm and the corresponding electric wire 517A, 517B to move inward, to be closer to the supporting wire 516. FIG. 12 shows the outrigger in an impacted position adopted when the electrified wire 517A or the outer end portion 513A of the arm 511 impacted in an inward direction toward the supporting wire 516.

FIG. 13 shows the double-ended outrigger of FIG. 11 in an alternative impacted position. In this case, the outrigger arms 511, 152 are also rotated by tilting, to raise one electric fence wire 517A while lowering the other 517B, for example if one of the electric fence wires or outer end portion of an arm is impacted. FIG. 13 shows the outrigger when the electrified wire 517A or the outer end portion 513A of the arm 511 is impacted in an inward direction toward the supporting wire 516 and when impacted in an upward direction.

The outrigger arms described above are preferably made from metal and are suitably made from galvanised high-tensile steel wire, but can be made from a plastics or other electrically insulative material. If the aims are made from electrically conductive material, either the support clip or hanger can be made from an electrically insulative material or the distal or proximal ends of the arms are insulated to isolate the electrified wires supported by the outrigger arm from the supporting fence or wire.

In some applications, and typically when the double-ended outriggers are supported on a fence located on undulating ground, the outriggers may flex excessively because of the relatively higher upward or downward forces exerted on the ends of the outrigger arms by the electric conductors, and particularly when the latter are tensioned. In this case, an outrigger may need to be strengthened or augmented by an auxiliary strengthening member that is fitted in parallel to the outrigger to span between the two electric conductors.

It is noted that when the outriggers are used on a fence located on undulating ground, and particularly when the fence line passes over depressions in the ground contour, the electric fence wires being supported by the outriggers can tend to rise, particularly when tensioned, and may need to be held down by the outriggers to more closely follow the ground contour. The outriggers may be inverted from the orientation shown in the figures and used to pull the electric fence wires down. For example, the outrigger arms 511, 512 shown in FIGS. 11, 12 and 13 may lie above the wire 516 from which it is supported, with the central hanger 520 linking the pivot loop 522 to the fence wire 516 below.

A suitable auxiliary member can be formed from a wire into a pair of aligned arms having end portions and tips of the end portions substantially the same as the double outrigger shown in FIGS. 11, 12 and 13. The strengthening member is located with its arms lying over the arms of the outrigger. The end portions of the strengthening member and the end portions of the outrigger are directed in opposite directions. The electric conductors are wrapped around the end portions of the arms of the strengthening member and are wrapped around the end portions of the arms of the outrigger. A central zone between the arms of the strengthening member is offset sideways to pass around, and give clearance to, the hanger of the outrigger.

The electric fence conductor is typically a single wire strand, e.g. a galvanised steel wire, or is a multi-stranded wire, or is made from one or more wire strands twisted, braided or woven with non-conductive supporting strands into a rope, tape or braid. The wire strands are advantageously made from stainless steel or tinned copper, and are advantageously supported by a woven or braided polyethylene material.

The outriggers described above can be added to a traditional post, batten and wire farm fence to carry electrified wires or other conductors offset outward from either one or both sides of the fence. The electrified conductors deter stock from coming into contact with the supporting fence. The outriggers and the electrified conductors can move back when impacted by stock or farm vehicles. This reduces the likelihood of such impacts misshaping the outriggers or otherwise damaging the outriggers or electrified conductors or to support fence itself, some of which can cause earthing or grounding of the electrified fence which can affect its effectiveness.

In another application, the outriggers are used to control one or more animals at a feeding zone. At least one outrigger according to the invention is suspended from a generally horizontal wire or other suitable support. An electrified conductor, such as an electric fence wire or tape, is suspended from an outer end of the outrigger to extend over the feeding zone. The electrified conductor is held at a height above the feeding zone that allows an animal holding its head down in a feeding posture to consume feed located at the feeding zone, but deters an animal at the feeding zone from raising its head substantially above a feeding posture or walking onto the feeding zone.

The outriggers suspend the electrified wire at a height at which the wire will contact an animal if it walks onto the feed. A suitable height for the electrified wire is just below the animal's backline or withers. At this height, the electrified wire allows feeding animals eating at the feeding zone to have full unrestricted feeding movement. But, if an animal attempts to walk onto or along the feeding zone, the animal will touch the suspended electrified wire causing the animal to receive a shock, causing the animal to move away.

Some previously-known feedlot control arrangements have used electrified wires at lower heights. In these arrangements, the increased likelihood of animals being shocked while feeding has resulted in shy feeders. The likelihood of causing shy feeders can be reduced by using electrified wires suspended at a height just below the animal's backline, from outriggers according to the invention.

This helps keep animals substantially outside the perimeter of the feeding zone and reduces spoilage of the feed by trampling, defecating or urinating by the animal on the feed. The outrigger or electric wire, if impacted by an animal, can move away from its rest position with no, or only temporary, deformation and without being damaged, and can then return back to its rest position after the animal has recoiled from the electric shock.

The animal feeding control system allows a feed pad or other zone to be substantially unencumbered by the bails or troughs and the like that have been traditionally used to try prevent spoilage of feed prior to its consumption. The unencumbered feed pad can then be more easily cleared and cleaned, when required. The electrified conductors can be suspended from several outriggers that are carried on one or more generally horizontal wires tensioned between two or more upright support posts. All parts of the feeding control system, other than the posts, are held above the pad making cleaning of the feed pad relatively straightforward.

FIGS. 14 and 15 show details, partly schematically, of outriggers having hangers that include an electrical switching device. Each outrigger has two electrically-conductive arms 611, 612 that extend outwardly in opposite directions from a centrally located open pivot loop 622. The two arms and the central pivot loop are conveniently made from a single length of wire, and preferably a galvanised steel wire. The outer ends of the two arms support electric fence wires (not shown in FIGS. 14 and 15) in a manner similar to the arrangement described above and shown in FIGS. 11, 12 and 13. Each outrigger includes a hanger that has an electrically insulative hanger body 620 that is similar, and operates similarly, to the hanger 520 described above and shown in FIGS. 11, 12 and 13.

In FIGS. 14 and 15, the outrigger is to be supported by a nail 635 that is shown in a position in preparation for location in a through-hole at the upper end of the hanger body. The nail is driven into the side of a supporting fence post (not shown). The through-hole has a diameter that is a loose fit on the nail so that the hanger body 620 can rotate freely about the axis provided by the nail.

Alternatively, the outrigger may be supported on a horizontal fence wire instead of the nail.

The hanger body 620 is made from an electrically insulating material, for example moulded from a polyethylene or other plastics material, to provide electrical isolation between the support nail 635 and the outriggers arms and the electric wires supported at the distal ends of the outrigger arms.

In the outrigger shown in FIG. 14, the electrical switching device is provided by an electrically-conductive pendulum 630 that has an open eye at its upper end and by an electrically-conductive lug 640 that has an open eye. The support nail 635 is located through the eyes of the pendulum and the lug. An insulating collar 637 insulates the pendulum and the lug from the support nail. The pendulum and the hanger body can each swing freely about a pivot axis provided by the nail.

At its distal end, the pendulum 630 has a tail 631. The tail lies approximately parallel to the axis provided by the support nail. The pendulum is in electrical contact with the lug. The lug can be connected to an electrically energised line 644 by an intermediate tie wire 642, as is shown schematically in FIG. 14.

When the pendulum 630 and the hanger body 620 are each hanging freely in a vertical orientation, the pendulum the tail 631 lies between, but not in contact with, the proximal ends of the two outrigger arms 611, 612 just below the opening of the central C-shaped loop 622. When in this freely hanging configuration, the outrigger does not provide electrical contact between the electrically energised line 644 and the outrigger arms and the wires supported at the outer ends of the outrigger arms.

Impact, such as by an animal, of either of the outrigger arms or the wires supported thereby rotates or displaces the outrigger arms 611 and 612 to cause a relative displacement of the lower end of the hanger body 620 and the pendulum tail 631. If this relative displacement is above a small threshold value, the pendulum tail is brought into electrical contact with the proximal end of one or other of the outrigger arms. This contact completes a conductive path from the electrically energised line 644, through the intermediate tie wire 642, the lug 640 and the pendulum 630, to the outrigger arms 611 and 612 and the wires supported at the outer ends of the outrigger arms. In this impacted configuration, the outrigger arms and the wires supported thereby are therefore electrically energised.

The outrigger and the wires supported thereby will return to the freely hanging arrangement on cessation of the impact, thereby breaking the electrical connection through the outrigger switching device.

In the outrigger shown in FIG. 15, the electrical switching device is provided by an electrically-conductive pendulum 632 that has an open eye at its upper end and by an electrically-conductive lug 640 that has an open eye. The support nail 635 is located through the eyes of the pendulum and the lug. An insulating collar 637 insulates the pendulum and the lug from the support nail. The pendulum and the hanger body can each swing freely about a pivot axis provided by the nail.

At its distal end, the pendulum 632 has twin tails 633A, 633B which are mounted by a freely pivotable joint 634 to the lower end of the body of the pendulum. The pivotable joint 634 has an axis that is approximately parallel to the axis provided by the support nail 635. The tails lie approximately parallel to the axis provided by the support nail. The pendulum is in electrical contact with the lug. The lug can be connected to an electrically energised line 644 by an intermediate tie wire 642, as is shown schematically in FIG. 15.

When the pendulum 632 and the hanger body 620 are each hanging freely in a vertical orientation, the tails 633A and 633B lie adjacent, but not in contact with, the proximal ends of the two outrigger arms 611, 612 on opposite sides of the central C-shaped loop 622. When in this freely hanging configuration, the outrigger does not provide electrical contact between the electrically energised line 644 and the outrigger arms and the wires supported at the outer ends of the outrigger arms.

Impact, such as by an animal, of either of the outrigger arms or the wires supported thereby rotates or displaces the outrigger arms 611 and 612 to cause a relative displacement of the lower end of the hanger body 620 and the pendulum tails 633A and 633B. If this relative displacement is above a small threshold value, one of the pendulum tails is brought into electrical contact with the proximal end of one or other of the outrigger arms. This contact completes a conductive path from the electrically energised line 644, through the intermediate tie wire 642, the lug 640 and the pendulum 632, to the outrigger arms 611 and 612 and the wires supported at the outer ends of the outrigger arms. In this impacted configuration, the outrigger arms and the wires supported thereby are therefore electrically energised.

The pivot joint 634 allows the pendulum tails 633A and 633B to swing relative to the body of the pendulum 632 so that rotation of the outrigger arms 611 and 612 relative to the hanger body 620 is not impeded by the pendulum tails.

The outrigger and the wires supported thereby will return to the freely hanging arrangement on cessation of the impact, thereby breaking the electrical connection through the outrigger switching device.

When in the freely hanging configuration, the outriggers described above with reference to FIGS. 14 and 15 have been said as not providing electrical contact between the electrically energised line 644 and the outrigger arms and the wires supported at the outer ends of the outrigger arms. However, in one typical practical arrangement, where wires are supported by a series of such switching outriggers, both wires and all outrigger arms of the series will be energised if any one switching outrigger is sufficiently rotated or displaced to activate the switching device of that outrigger and thereby complete an electrical connection of the electrically energised line 644 through the switching device of the displaced outrigger to both wires and all other outriggers of the series.

The outriggers with the switching devices allow animals to make slight contact with the wires or the outrigger arms and pull back before causing the wires and arms to be electrically energised. This can be useful when the outriggers are used to control animals at a feeding zone. Without the switching as described above, the animals can receive shocks even if only lightly touching the outrigger arms and the wires supported by the outrigger arms. This can make the animals shy feeders because the animals get little or no warning before being electrically shocked. In contrast, the switching outriggers allow the animals to become accustomed to feeding up to the point where they can lightly touch the outriggers and wires supported by the outriggers without being electrically shocked.

However, any animal attempting to significantly intrude into the controlled feeding zone will cause the outrigger switching device to connect the outriggers and wires to the electrically energised line to electrically shock and thereby repel the animal.

The foregoing describes the invention with reference to preferred embodiments. Alterations and modifications as will be obvious to those skilled in the art are intended to be incorporated within the scope of the invention as defined in the accompanying claims. For example, although the preferred embodiment described above is an outrigger for a farm fence having parallel wires supported by post and optionally battens, the outriggers are similarly applicable to other fences, e.g. wire mesh fences, and to walls.

What I claim is:

1. An outrigger for carrying at least one elongate electric conductor at a distance outward from a support, the outrigger comprising:
    a first arm which is elongate and has a proximal end and a distal end,
    a first support device at the distal end of the first arm,
    a second support device at the proximal end of the first arm,
    a second arm which is elongate and extends from the second support device to a distal end of the second arm, and
    a third support device at the distal end of the second arm,
    the first and second arms are arranged so that the second support device lies between the first and third support devices,
    the first support device being adapted for suspending a portion of a first elongate electric conductor from the distal end of the first arm, a major length portion of the first support device is substantially straight and extends substantially perpendicularly from an end of the first arm, a minor length portion of the first said support device extends from a distal end of the major length portion of the first support device and is not aligned with that major length portion, and movement of the outrigger along the first elongate electric conductor can be resisted by engagement of the major and minor length portions of the first support device with the first elongate electric conductor,
    the third support device is adapted for suspending a portion of a second elongate electric conductor from the distal end of the second arm,
    the second support device is adapted for suspending the outrigger from a support,
    the second support device being pivotally connectable to the support at an upper hanger axis and pivotally connected relative to the first arm and the second arm at a lower hanger axis,
    the outrigger being adapted so that when the outrigger is suspended from the support by the second support device, the portion of the first elongate electric conductor is suspended from the first support device and the portion of the second elongate electric conductor is suspended from the third support device, the outrigger has a rest position in which the first arm extends outwardly from the support, and the second arm extends outwardly from the support,
    the outrigger being movable from the rest position in a direction toward the support when the first support device or the portion of the first electric conductor is impacted to move the first support device and the portion of the first elongate electric conductor toward the support, and afterwards to move the outrigger back to the rest position, the outrigger being movable by the second support device pivoting relative to the support about the upper hanger axis and/or the first arm pivoting relative to the second support about the lower hanger axis,
    the outrigger being movable from the rest position in a direction toward the support when the third support device or the portion of the second electric conductor is impacted to move the third support device and the portion of the second elongate electric conductor toward the support, and afterwards to move the outrigger back to the rest position, the outrigger being movable by the second support device pivoting relative to the support about the upper hanger axis and/or the second arm pivoting relative to the second support about the lower hanger axis.

2. An outrigger as claimed in claim 1, wherein the outrigger is further adapted so that when the outrigger is suspended from the support by the second support device and is suspending the portion of the first elongate electric conductor from the first support device, the outrigger is rotatable, about an axis substantially parallel to the portion of the first elongate electric conductor, from the rest position, to move the first support device and the portion of the first electric conductor toward the support when the first support device or the portion of the first elongate electric conductor is impacted in a direction toward the support, and afterwards to rotate back to the rest position.

3. An outrigger as claimed in claim 1, wherein the first and second arms are arranged so that the second support device lies between, but not in line with, the first and third support devices.

4. An outrigger as claimed in claim 1, wherein the third support device is adapted for gripping the portion of the second elongate electric conductor and thereby resisting sliding movement of the third support device along the second elongate electric conductor.

5. A method of using an outrigger as claimed in claim 1, wherein the outrigger is suspended from the support by the second support device, the portion of the first elongate electric conductor is suspended from the first support device, and the portion of the second elongate electric conductor is suspended from the third support device, the outrigger being moveable from the rest position to move the first support device and the portion of the first elongate electric conductor toward the support when the first support device or the portion of the first elongate electric conductor is impacted in a direction toward the support, and afterwards moves back to the rest position, the outrigger being movable by the second support device pivoting relative to the support about the upper hanger axis and/or the first arm pivoting relative to the second support about the lower hanger axis, the outrigger being movable from the rest position to move the third support device and the portion of the second elongate electric conductor toward the support when the third support device or the portion of the second electric conductor is impacted in a direction towards the support, and afterwards to move the outrigger back to the rest position, the outrigger being movable by the second support device pivoting relative to the support about the upper hanger axis and/or the second arm pivoting relative to the second support about the lower hanger axis and movement of the outrigger along the first elongate electric conductor is resisted by engagement of the major and minor length portions of the first support device with the first elongate electric conductor.

6. A method of using an outrigger as claimed in claim 5, wherein the outrigger is returned back to the rest position at least in part by tension in the first elongate electric conductor.

7. A method of using an outrigger as claimed in claim 5, wherein the outrigger is returned back to the rest position at least in part by gravity.

8. A method of using an outrigger as claimed in claim 5, wherein the support is a wire fence and the outrigger is supported by the second support device from a substantially horizontal wire of the wire fence.

9. A method of using an outrigger as claimed in claim 1, wherein the outrigger rotates from the rest position to move the first support device and the portion of the first electric conductor toward the support when the first support device or the portion of the first electric conductor is impacted in a direction toward the support, or to move the third support device and the portion of the second electric conductor toward the support when the third support device or the portion of the second electric conductor is impacted in a direction toward the support, and afterwards rotates back to the rest position.

10. A method of using an outrigger as claimed in claim 1, wherein the second support device rotates to move the outrigger from the rest position and to move the first support device and the portion of the first elongate electric conductor toward the support when the first support device or the portion of the first elongate electric conductor is impacted in a direction toward the support, and afterwards to rotate to move the outrigger back to the rest position.

11. A method of controlling at least one animal at a feeding zone, the method comprising;

suspending an elongate electric conductor from a respective first support device at the distal end of the first arm of at least one outrigger as claimed in claim 1, suspending the elongate electric conductor adjacent the feeding zone, and electrifying the elongate electric conductor, and thereby deterring the animal or animals from spoiling feed located at the feeding zone prior to consumption of the feed by the animal or animals.

12. A method of controlling at least one animal at a feeding zone, as claimed in claim 11, wherein the elongate electric conductor is suspended above the feeding zone at a height that deters animals feeding at the feeding zone from substantially raising their heads above a feeding posture.

13. An outrigger, for carrying at least one elongate electric conductor at a distance outward from a support, the outrigger comprising:

a first arm which is elongate and has a proximal end and a distal end, a first support device at the distal end of the first arm, a second support device at the proximal end of the first arm, a second arm which is elongate and extends from the second support device to a distal end of the second arm, and a third support device at the distal end of the second arm, the first and second arms are arranged so that the second support device lies between the first and third support devices, the first support device being adapted for suspending a portion of a first elongate electric conductor from the distal end of the first arm, a major length portion of the first support device is substantially straight and extends substantially perpendicularly from an end of the first arm, a minor length portion of the first said support device extends from a distal end of the major length portion of the first support device and is not aligned with that major length portion, and movement of the outrigger along the first elongate electric conductor can be resisted by engagement of the major and minor length portions of the first support device with the first elongate electric conductor, the third support device is adapted for suspending a portion of a second elongate electric conductor from the distal end of the second arm, the second support device is adapted for suspending the outrigger from a support, the second support device being pivotally connectable to the support at an upper hanger axis and pivotally connected relative to the first arm and the second arm at a lower hanger axis, the outrigger being adapted so that when the outrigger is suspended from the support by the second support device, the portion of the first elongate electric conductor is suspended from the first support device and the portion of the second elongate electric conductor is suspended from the third support device, the outrigger has a rest position in which the first arm extends outwardly from the support and the second arm extends outwardly from the support, the outrigger being movable from the rest position in a direction toward the support when the first support device or the portion of the first electric conductor is impacted to move the first support device and the portion of the first elongate electric conductor toward the support, and afterwards to move the outrigger back to the rest position, the outrigger being movable by the second support device pivoting relative to the support about the upper hanger axis and/or the first arm pivoting relative to the second support about the lower hanger axis, the outrigger being movable from the rest position in a direction toward the support when the third support device or the portion of the second electric conductor is impacted to move the third support device and the portion of the second elongate electric conductor toward the support, and afterwards to move the outrigger back to the rest position, the outrigger being movable by the second support device pivoting relative to the support about the upper hanger axis and/or the second arm pivoting relative to the second support about the lower hanger axis wherein the second support device comprises:
- an electrically insulative body and an electrically conductive switch member, the electrically conductive switch member having twin tails which are mounted by a freely pivotable joint to the lower end of the electrically insulative body,
- the electrically insulative body and the electrically conductive switch member each being adapted for swinging about the upper hanger axis to hang in respective rest positions in which the electrically conductive switch member is not in contact with either the first or second arm but comes into contact with either the first or second arm when the insulative body is substantially rotated or displaced from its rest position to cause a relative displacement of a lower end of the second support device and the twin tails.

* * * * *

UNITED STATES PATENT AND TRADEMARK OFFICE
CERTIFICATE OF CORRECTION

| | | |
|---|---|---|
| PATENT NO. | : 8,727,321 B2 | Page 1 of 1 |
| APPLICATION NO. | : 12/934955 | |
| DATED | : May 20, 2014 | |
| INVENTOR(S) | : Dalrymple et al. | |

It is certified that error appears in the above-identified patent and that said Letters Patent is hereby corrected as shown below:

In the Specification

Column 12
Line 12, change "wise" to -- wire --

Column 15
Line 18, change "try prevent spoilage" to -- try to prevent spoilage --

Column 16
Line 4, change "the pendulum the tail" to -- the pendulum of the tail --

Signed and Sealed this
Twenty-third Day of September, 2014

Michelle K. Lee
*Deputy Director of the United States Patent and Trademark Office*